(No Model.)

B. D. WINNIE.
CAKE OR BISCUIT CUTTER.

No. 549,760. Patented Nov. 12, 1895.

WITNESSES:
Edwin T. McKee,
Louis G. Randall.

INVENTOR
Bradford D. Winnie
BY
John Wedderburn
his ATTORNEY.

UNITED STATES PATENT OFFICE.

BRADFORD D. WINNIE, OF GRAND TRAVERSE COUNTY, MICHIGAN.

CAKE OR BISCUIT CUTTER.

SPECIFICATION forming part of Letters Patent No. 549,760, dated November 12, 1895.

Application filed March 19, 1895. Serial No. 542,360. (No model.)

*To all whom it may concern:*

Be it known that I, BRADFORD D. WINNIE, a citizen of the United States, residing in Grand Traverse county, near Elk Rapids, in the county of Antrim and State of Michigan, have invented certain new and useful Improvements in Cake or Biscuit Cutters; and I do hereby declare the following to be a full, clear, and exact description of the invention, such as will enable others skilled in the art to which it appertains to make and use the same.

My invention relates to improvements in cake and biscuit cutters, having for its object to provide a device of this kind which will quickly and readily cut dough in proper shape for making biscuits and cakes and at the same time will expel the dough contained within the cutter proper.

The invention consists of a cutter having a series of slots around its outer side, a suitable handle, a bracket secured upon crossbars connected to the upper side of said cutter, a rod passing loosely through said bracket connected at its lower end to the expelling disk, a spring for normally urging said rod downwardly, and legs connected to the under side of said disk projecting through the slots in said cutter and depending downwardly therefrom.

The invention also consists in other details of construction, which will be more fully hereinafter described and claimed.

Figure 1:
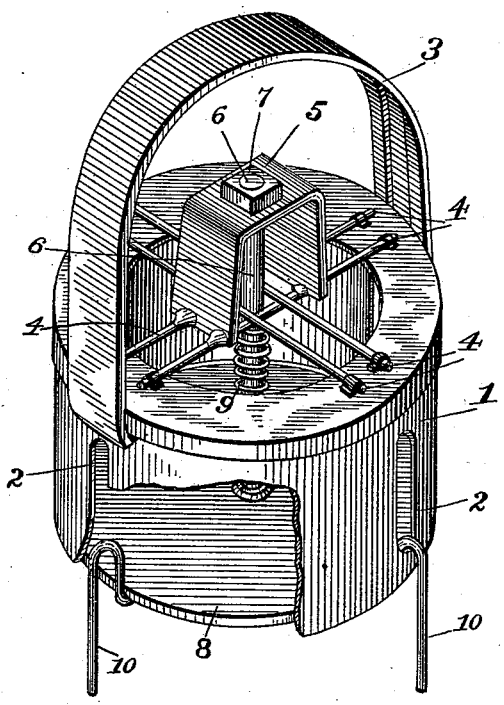
Figure 2:
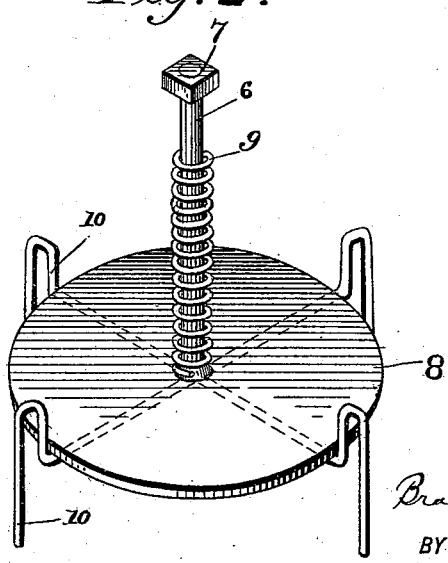

In the drawings, Figure 1 represents a perspective view of my device, and Fig. 2 is a similar view in detail of the expelling-disk.

Like reference-numerals indicate like parts in both the views.

Referring to the drawings, it will be seen that 1 represents the cutter proper, formed with a series of elongated vertical slots 2 around its outer surface, and with a suitable handle 3. Connecting the upper edges of the cutter are a series of rods or wires 4, upon which is supported a bracket 5, perforated at its central point, through which extends a rod 6, having a nut 7 upon its upper end, and connected at its lower end to an expelling-disk 8. A spring 9, acting against the upper side of the expelling-disk 8 and the under side of the rods or wires 4, tends to urge the expelling-disk 8 and rod 6 normally downward. The lower side of the expelling-disk has secured to it rods or wires 10, turned upwardly at the periphery of the disk, passing through the slots 2 in the cutter 1 and then bent downwardly, forming legs for the device to rest upon.

In using my device the cutter is used in the ordinary manner, and as the same is depressed for the purpose of cutting, the expelling-disk is raised against the pressure of the dough. When the cutter has been removed from the dough, the action of the spring 9 is to throw the disk 8 downwardly and expel the dough contained within the cutter 1. By the arrangement of the slots 2 with the legs 10 extending therethrough I am enabled to locate the position of the cutter upon the dough accurately. Furthermore, these legs provide a means for resting the entire device without bringing any of the operative parts in contact with a dirty table or otherwise, and the downward movement of the disk 8 is limited. The device is very simple in construction and extremely effective in operation.

Having now described my invention, what I claim as new, and desire to secure by Letters Patent, is—

The combination of a cutter formed with a series of vertically disposed slots and with a suitable handle, a bracket secured upon the frame work of the central portion of the cutter, a rod passing through said bracket, an expelling disk connected to the lower end of said rod, a spring for normally urging said expelling disk downwardly, and legs secured to the under side of said disk and projecting through the slots in said cutter, substantially as and for the purpose described.

In testimony whereof I have signed this specification in the presence of two subscribing witnesses.

BRADFORD D. WINNIE.

Witnesses:
 CHAS. S. MCLAUGHLIN,
 JOSEPH BUTLER.